(12) United States Patent
Mauduit et al.

(10) Patent No.: US 9,046,406 B2
(45) Date of Patent: Jun. 2, 2015

(54) ADVANCED ANTENNA PROTECTION FOR RADARS IN LEVEL GAUGING AND OTHER APPLICATIONS

(75) Inventors: Laurent Mauduit, Vignoux sous les Aix (FR); Bin Sai, Den Haag (NL); Michel Delsard, Vasselay (FR)

(73) Assignee: Honeywell International Inc., Morristown, NJ (US)

( * ) Notice: Subject to any disclaimer, the term of this patent is extended or adjusted under 35 U.S.C. 154(b) by 359 days.

(21) Appl. No.: 13/444,627

(22) Filed: Apr. 11, 2012

(65) Prior Publication Data
US 2013/0269430 A1 Oct. 17, 2013

(51) Int. Cl.
G01F 23/284 (2006.01)

(52) U.S. Cl.
CPC .................... G01F 23/284 (2013.01)

(58) Field of Classification Search
CPC ..................................... G01F 23/284
USPC ................. 73/290 V, 290 R, 290 B
See application file for complete search history.

(56) References Cited

U.S. PATENT DOCUMENTS

| | | |
|---|---|---|
| 3,217,267 A | 11/1965 | Loposer |
| 3,337,814 A | 8/1967 | Brase et al. |
| 3,353,104 A | 11/1967 | Loposer |
| 3,579,281 A | 5/1971 | Kam et al. |
| 3,789,302 A | 1/1974 | Rearwin et al. |
| 3,903,482 A | 9/1975 | Pausini et al. |
| 4,000,476 A | 12/1976 | Walker et al. |
| 4,024,464 A | 5/1977 | Underhill et al. |
| 4,027,274 A | 5/1977 | Fukui et al. |
| 4,068,199 A | 1/1978 | Madoff |
| 4,072,947 A | 2/1978 | Johnson |
| 4,114,110 A | 9/1978 | Nossen |
| 4,361,801 A | 11/1982 | Meyer et al. |
| 4,451,930 A | 5/1984 | Chapman et al. |
| 4,510,461 A | 4/1985 | Dickes et al. |
| 4,516,084 A | 5/1985 | Crowley |
| 4,567,448 A | 1/1986 | Ikeda |
| 4,675,617 A | 6/1987 | Martin |
| 4,691,176 A | 9/1987 | Hsiung et al. |
| 4,800,341 A | 1/1989 | Johnson |
| 4,823,399 A | 4/1989 | George |

(Continued)

FOREIGN PATENT DOCUMENTS

| | | |
|---|---|---|
| DE | 296 08 551 U1 | 7/1996 |
| DE | 100 40 180 A1 | 4/2002 |

(Continued)

OTHER PUBLICATIONS

JP 10197617A_English translation.*

(Continued)

*Primary Examiner* — Hezron E Williams
*Assistant Examiner* — Xin Zhong

(57) ABSTRACT

A level gauge includes at least one antenna configured to transmit wireless signals towards a material in a tank and to receive wireless signals reflected from the material in the tank. The level gauge also includes a housing having an outer portion, a raised rim within the outer portion, an angled portion that extends between the outer portion and the rim, and a concave portion within the rim. The concave portion forms a crater within the housing. The at least one antenna is configured to transmit and receive the wireless signals through the concave portion of the housing.

20 Claims, 4 Drawing Sheets

(56) References Cited

U.S. PATENT DOCUMENTS

| | | | |
|---|---|---|---|
| 4,868,494 A | 9/1989 | Ryder et al. | |
| 4,958,228 A | 9/1990 | Kutsuki | |
| 4,972,160 A | 11/1990 | Sylvain | |
| 5,027,526 A | 7/1991 | Crane | |
| 5,034,703 A | 7/1991 | Schumacher | |
| 5,036,291 A | 7/1991 | Marz | |
| 5,052,028 A | 9/1991 | Zwack | |
| 5,210,539 A | 5/1993 | Voyce | |
| 5,270,669 A | 12/1993 | Jokura | |
| 5,400,253 A | 3/1995 | O'Connor | |
| 5,406,842 A | 4/1995 | Locke | |
| 5,428,361 A | 6/1995 | Hightower et al. | |
| 5,442,359 A | 8/1995 | Rubin | |
| 5,446,416 A | 8/1995 | Lin et al. | |
| 5,572,167 A | 11/1996 | Alder et al. | |
| 5,642,121 A | 6/1997 | Martek et al. | |
| 5,708,424 A | 1/1998 | Orlando et al. | |
| 5,734,302 A | 3/1998 | Teng et al. | |
| 5,773,913 A | 6/1998 | Casselden | |
| 5,774,089 A | 6/1998 | Bamler et al. | |
| 5,923,284 A | 7/1999 | Artis et al. | |
| 5,994,905 A | 11/1999 | Franchville | |
| 6,107,957 A | 8/2000 | Cramer et al. | |
| 6,114,987 A | 9/2000 | Bjornholt | |
| 6,374,187 B1 | 4/2002 | Knight et al. | |
| 6,404,288 B1 | 6/2002 | Bletz et al. | |
| 6,621,449 B1 | 9/2003 | Kunert | |
| 6,629,458 B1 * | 10/2003 | Westerling et al. | 73/290 V |
| 6,636,575 B1 | 10/2003 | Ott | |
| 6,662,649 B1 | 12/2003 | Knight et al. | |
| 6,671,500 B2 | 12/2003 | Damgaard et al. | |
| 6,762,634 B1 | 7/2004 | Hattori | |
| 6,774,732 B1 | 8/2004 | Harnishfeger et al. | |
| 6,876,261 B2 | 4/2005 | Gumm | |
| 6,876,621 B2 | 4/2005 | Ohuchida et al. | |
| 6,891,513 B2 * | 5/2005 | Kienzle et al. | 343/786 |
| 7,135,870 B2 | 11/2006 | Mohajer et al. | |
| 7,891,229 B2 | 2/2011 | Sai | |
| 8,098,193 B2 | 1/2012 | Sai et al. | |
| 2002/0101373 A1 | 8/2002 | Arndt et al. | |
| 2002/0126061 A1 * | 9/2002 | Griessbaum et al. | 343/786 |
| 2002/0183030 A1 | 12/2002 | Damgaard et al. | |
| 2003/0167839 A1 | 9/2003 | Burger et al. | |
| 2004/0080324 A1 * | 4/2004 | Westerling et al. | 324/644 |
| 2004/0196177 A1 | 10/2004 | Billington et al. | |
| 2004/0207477 A1 | 10/2004 | Gumm | |
| 2005/0052314 A1 | 3/2005 | Spanke et al. | |
| 2005/0190098 A1 | 9/2005 | Bridgelall et al. | |
| 2005/0206555 A1 | 9/2005 | Bridgelall et al. | |
| 2006/0044145 A1 | 3/2006 | Akerstrom et al. | |
| 2006/0044147 A1 | 3/2006 | Knox et al. | |
| 2006/0109010 A1 * | 5/2006 | Edvardsson | 324/644 |
| 2006/0143000 A1 | 6/2006 | Setoguchi | |
| 2007/0046528 A1 | 3/2007 | Larsson et al. | |
| 2007/0109177 A1 | 5/2007 | Baath et al. | |
| 2007/0115196 A1 * | 5/2007 | Motzer et al. | 343/786 |
| 2009/0128396 A1 * | 5/2009 | Fehrenbach et al. | 342/124 |
| 2009/0219192 A1 * | 9/2009 | Algra | 342/124 |
| 2010/0002912 A1 | 1/2010 | Solinsky | |
| 2010/0037673 A1 | 2/2010 | Wicht et al. | |
| 2010/0066589 A1 | 3/2010 | Sai et al. | |
| 2010/0070207 A1 | 3/2010 | Sai | |
| 2010/0070208 A1 | 3/2010 | Sai | |
| 2010/0070209 A1 | 3/2010 | Sai | |
| 2010/0079348 A1 | 4/2010 | Dietmeier | |
| 2010/0175470 A1 | 7/2010 | Schrier et al. | |
| 2010/0241369 A1 | 9/2010 | Wicht et al. | |
| 2011/0163910 A1 | 7/2011 | Sai | |
| 2012/0239676 A1 * | 9/2012 | Kaneko et al. | 707/758 |

FOREIGN PATENT DOCUMENTS

| | | |
|---|---|---|
| DE | 10 2004 061449 A1 | 6/2006 |
| DE | 10 2005 019 095 A1 | 10/2006 |
| EP | 0 573 034 A | 12/1993 |
| EP | 0 887 658 A | 12/1998 |
| GB | 2 064 188 A | 6/1981 |
| GB | 2 342 995 A | 4/2000 |
| JP | 10-197617 | 7/1998 |
| JP | 10197617 A * | 7/1998 |
| NL | 1032192 | 7/2006 |
| WO | WO 98/12514 A1 | 3/1998 |
| WO | WO 2004/018978 A1 | 3/2004 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/104967 A2 | 9/2008 |
| WO | WO 2010/019427 A2 | 2/2010 |

OTHER PUBLICATIONS

International Search Report and Written Opinion of International Searching Authority dated Jul. 25, 2013 in connection with International Application No. PCT/US2013/033636, 12 pages.
"HERMetic Sensor", Honeywell Enraf, (no month) 2007, 5 pages.
"Servo Gauge 854ATG" Product Sheet, Enraf B.V., May 2008, 4 pages.
"Starrett Digitape 25", 1999 and possibly earlier, 4 pages.
European Search Report dated Aug. 17, 2010 in connection with European Patent Application No. EP 10 15 5559.
International Standard, Petroleum and liquid petroleum products-Measurement of level and temperature in storage tanks by automatic methods, Part 3: Measurement of level in pressurized storage tanks (non-refrigerated), 1st Edition, Nov. 15, 2002, 21 pages.
"Level sensor", wikipedia.org, Aug. 2, 2008, 8 pages.
Communication pursuant to Article 94(3) EPC dated Jan. 11, 2010 in connection with European Patent Application No. EP 09169534.
European Search Report dated Dec. 14, 2009 in connection with European Patent Application No. EP 09169534.
Notification of Transmittal of the International Search Report and the Written Opinion of the International Searching Authority, or the Declaration dated Oct. 28, 2008 in connection with PCT Patent Application No. PCT/NL2008/000196.
Bai Sin, et al., "Advanced High Precision Radar Gauge for Industrial Applications", Proceedings of the 2006 CIE International Conference on Radar, vol. 1, Oct. 16, 2006, pp. 463-466.
Partial European Search Report dated Dec. 10, 2009 in connection with European Patent Application No. EP 09 16 9962.
Communication pursuant to Article 94(3) EPC dated Apr. 12, 2010 in connection with European Patent Application No. 09 169 962.9.
Summons to attend oral proceedings pursuant to Rule 115(1) EPC dated Jun. 16, 2011 in connection with European Patent Application No. 09 169 962.9.

* cited by examiner

ADVANCED ANTENNA PROTECTION FOR RADARS IN LEVEL GAUGING AND OTHER APPLICATIONS

TECHNICAL FIELD

This disclosure relates generally to radar systems. More specifically, this disclosure relates to advanced antenna protection for radars in level gauging and other applications.

BACKGROUND

Processing facilities and other facilities routinely include tanks for storing liquid materials and other materials. For example, storage tanks are routinely used in tank farm facilities and other storage facilities to store oil or other materials. As another example, oil tankers and other transport vessels routinely include numerous tanks storing oil or other materials.

Often times, it is necessary or desirable to measure the amount of material stored in a tank. This may be useful, for example, during loading of material into the tank or unloading of material from the tank. As particular examples, "custody transfers" and "weights and measures of oil" often require highly accurate measurements from level gauging instruments installed on the roof of a tank. In bulk storage tanks, an error of one millimeter in a level reading can correspond to several cubic meters of volumetric error. This can result in losses of thousands of dollars for one or more parties.

Radar gauges are one type of non-contact level gauge used for the last several decades. Radar gauges typically transmit wireless signals towards a material in a tank and receive wireless signals reflected off the material in the tank. Unfortunately, radar measurements can be affected by multiple reflections inside a tank, such as reflections from the tank's walls, bottom, roof, and obstructions like agitators, ladders, and heat coils. Furthermore, the full capacity of a tank is often used for storage and transfer. For this reason, level measurements typically need to be constantly reliable even as the level of material approaches the bottom or roof of the tank, which can be difficult to achieve with conventional radar gauges.

One approach to solving these problems is to use narrow radar beams with smaller antennas. A smaller antenna can often fit into various nozzles of a tank, eliminating the costs associated with forming large "man-holes" in the tank. Moreover, narrower beams can avoid reflections from other objects in a tank. Therefore, millimeter-wave radars with ultra-wide bandwidths have been proposed. However, the material in a tank can be aggressive (such as highly corrosive), and the pressure inside the tank can be higher than atmospheric pressure. As a result, robust protection of sensitive level gauging equipment, such as millimeter-wave radars, can be very important for achieving high performance and lower cost.

SUMMARY

This disclosure provides advanced antenna protection for radars in level gauging and other applications.

In a first embodiment, a level gauge includes at least one antenna configured to transmit wireless signals towards a material in a tank and to receive wireless signals reflected from the material in the tank. The level gauge also includes a housing having an outer portion, a raised rim within the outer portion, an angled portion that extends between the outer portion and the rim, and a concave portion within the rim. The concave portion forms a crater within the housing. The at least one antenna is configured to transmit and receive the wireless signals through the concave portion of the housing In a second embodiment, an apparatus includes a housing configured to protect one or more wireless components. The housing includes an outer portion, a raised rim within the outer portion, an angled portion that extends between the outer portion and the rim, and a concave portion within the rim. The concave portion forms a crater within the housing and is substantially transparent to wireless signals used by the one or more wireless components.

In a third embodiment, a method includes transmitting wireless signals towards a material in a tank through a housing and receiving wireless signals reflected from the material in the tank through the housing. The housing includes an outer portion, a raised rim within the outer portion, an angled portion that extends between the outer portion and the rim, and a concave portion within the rim. The concave portion forms a crater within the housing and is substantially transparent to the wireless signals.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken, in conjunction with the accompanying drawings, in which.

DETAILED DESCRIPTION

FIGS. 1A through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1A:
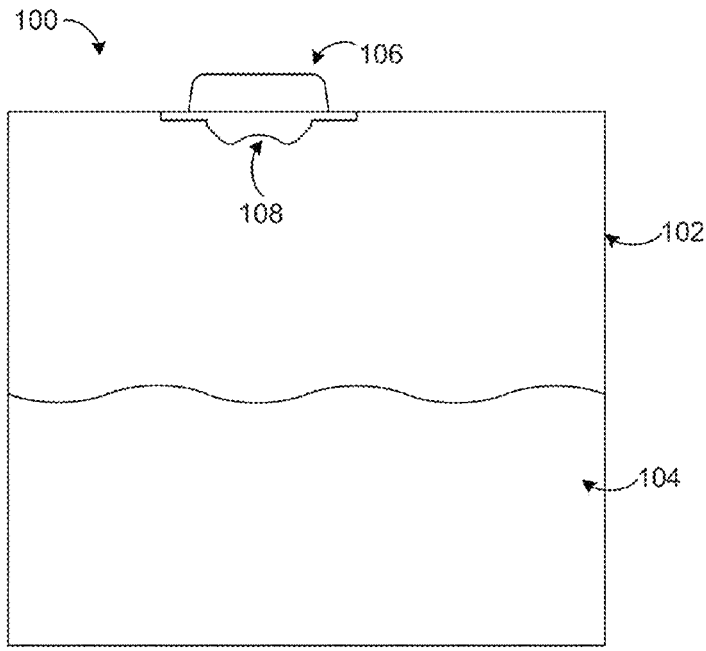
FIGS. 1A and 1B illustrate example tank level measurement systems according to this disclosure.
Figure 1B:
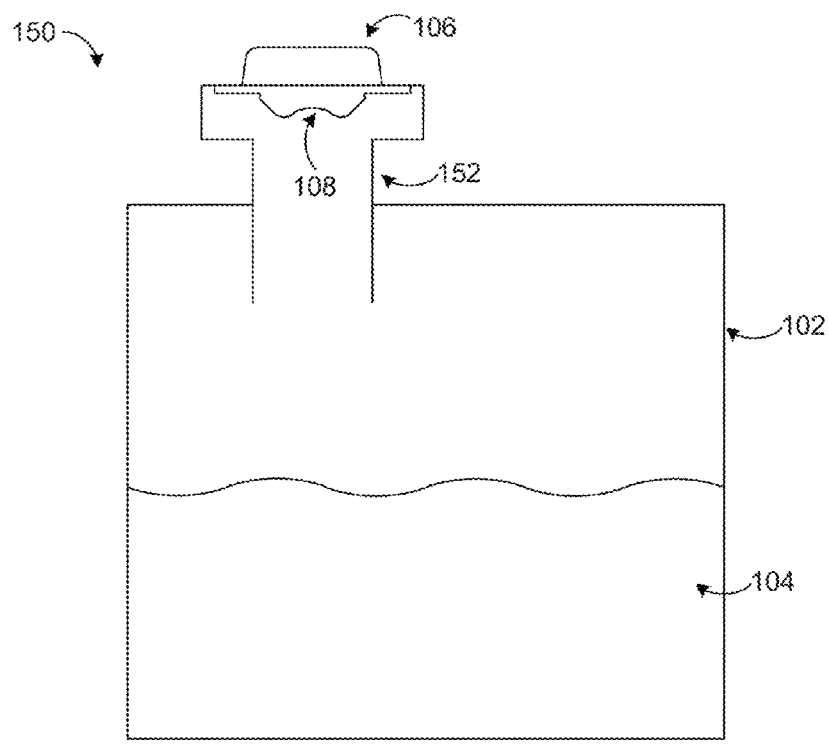

FIGS. 1A and 1B illustrate example tank level measurement systems according to this disclosure. As shown in FIG. 1A, a system 100 is used in conjunction with a tank 102 that can store one or more materials 104. The tank 102 generally represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

The system 100 includes a level gauge 106 on a roof of the tank 102. The gauge 106 is used to measure the level of material 104 in the tank 102. For example, an antenna in the gauge 106 transmits wireless signals towards the material 104 and receives reflected signals from the material 104. The gauge 106 can then analyze the signals to determine the level of material 104 in the tank 102. The gauge 106 includes any suitable structure for generating signals for wireless transmission towards material in a tank and receiving reflected signals from the material in the tank.

In some embodiments, the gauge 106 supports the use of wireless signals in the ultra-wideband (UWB) "millimeter wave" (MMW) range, which extends from about 30 GHz to about 300 GHz. With MMW frequency operation, the gauge's antenna can be miniaturized, such as to fit into a small nozzle in the roof of the tank 102. The nozzle could facilitate access to the tank 102. A UWB gauge 106 with a narrow beam width can solve various problems discussed above, such as interference caused by reflections from the tank's walls, bottom, roof, and obstructions like agitators, ladders, and heat coils. Moreover, this type of gauge 106 can be constantly reliable even as the level of material 104 approaches the bottom or roof of the tank 102. In addition, this type of gauge 106 can be accurate even in the presence of interference from multiple closely-spaced objects in the tank 102.

As shown in FIG. 1A, the gauge 106 includes a cover 108 that protects the antenna and other components of the gauge 106 from the environment within the tank 102. Conventional systems cannot easily protect the front of an MMW antenna lens under harsh environmental conditions without significantly degrading the performance of the radar. As described in more detail below, the gauge 106 includes the protective cover 108, which is generally described as having a "volcano cone" shape. Among other things, this protective cover 108 provides robustness against chemical liquids and vapors in the tank 102, provides a mechanism against water condensation on a surface of the antenna, and provides reliable high performance. As such, this protective cover 108 can be used with UWB level gauges or other devices operating in the MMW range without significantly interfering with the operation of those devices.

FIG. 1B illustrates another example system 150 that uses the level gauge 106 with the protective cover 108. In this example, the level gauge 106 is mounted on a trunk 152 that extends above the tank 102. The trunk 152 provides access to an interior of the tank 102 while maintaining the level gauge 106 in a position above the roof of the tank 102. As a particular example, the trunk 152 can be used on a transport vessel to hold the level gauge 106 above the deck of the vessel to help keep water off the gauge 106, as well as to avoid direct contact with material inside the tank.

Although FIGS. 1A and 1B illustrate examples of tank level measurement systems 100 and 150, various changes may be made to FIGS. 1A and 1B. For example, each system could include any number of tanks, level gauges, and other components. Also, the functional division shown in each figure is for illustration only. Various components in each figure could be omitted, combined, or further subdivided and additional components could be added according to particular needs. As a particular example, the signal processing functionality described as being performed by the level gauge 106 could be performed by a processing system outside of and coupled to the level gauge 106. In addition, FIGS. 1A and 1B illustrates example ways in which the level gauge 106 could be used. However, the level gauge 106 could be used in other ways.

Figure 2A:
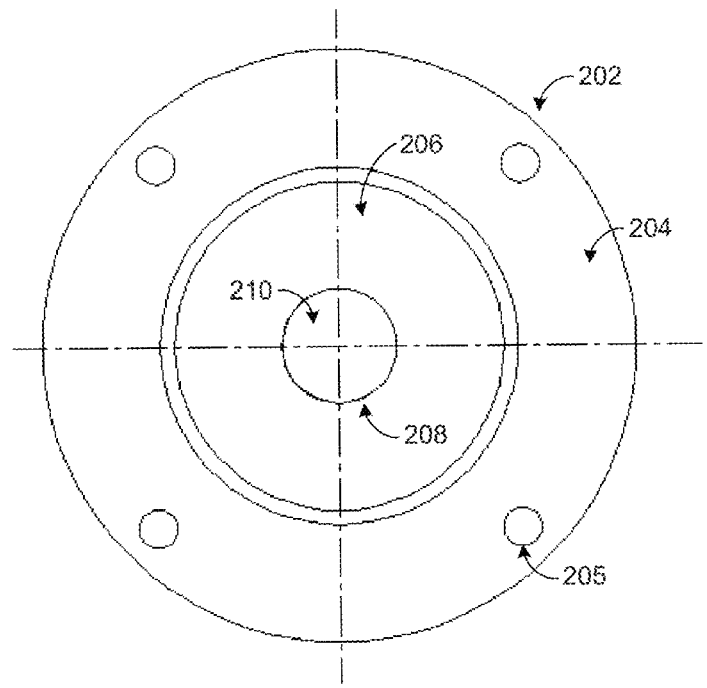
FIGS. 2A, 2B, 3 and 4 illustrate example level gauges with advanced antenna protection in a level gauging system according to this disclosure.

FIGS. 2A through 4 illustrate example level gauges with advanced antenna protection in a level gauging system according to this disclosure. FIGS. 2A and 2B illustrate one possible implementation of a level gauge 200 with advanced antenna protection. In particular, FIG. 2A illustrates a bottom view of the gauge 200, and FIG. 2B illustrates a cross-sectional view of the gauge 200 through a center of the gauge 200 in FIG. 2A. The gauge 200 could, for example, form at least part of the level gauge 106 in the systems 100, 150 of FIGS. 1A and 1B.

Figure 2B:
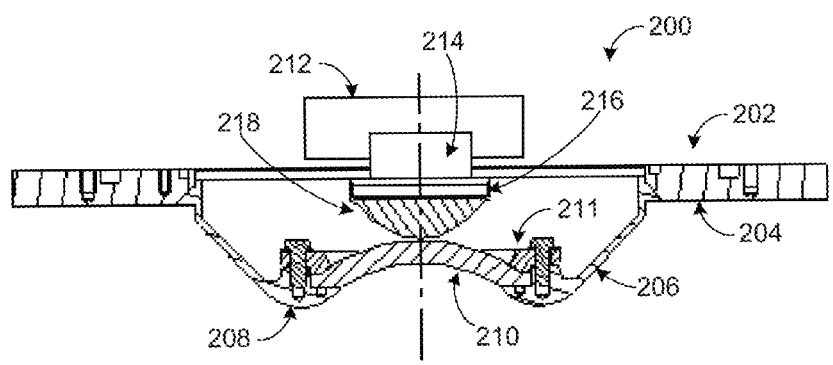

As shown in FIGS. 2A and 2B, the gauge 200 includes a lower housing 202. The lower housing 202 helps to encase internal components of the gauge 200, separating the internal components from the environment within a tank 102. In this example, the lower housing 202 includes an outer annular region 204, which here is generally flat on top and on bottom. Note, however, that the top and bottom surfaces of the outer annular region 204 could have other shapes. For instance, the top of the outer annular region 204 could be shaped to conform to the inner surface of the tank 102, and the bottom of the outer annular region 204 could have any other desired shape. The outer annular region 204 here includes various openings 205 that allow the lower housing 202 to be bolted or otherwise secured against another structure. As particular examples, the lower housing 202 could be secured against the top of a tank 102, an upper housing, or other structure to form an air-tight seal against the contents of the tank 102.

The lower housing 202 also includes an angled annular region 206 that extends from the outer annular region 204 to a raised annular rim 208. The angled annular region 206 in this example has generally straight sides, and the raised annular rim 208 is rounded. Of course, the sides of the angled annular region 206 need not be straight, and the raised annular rim 208 could have any other suitable shape.

In addition, the lower housing 202 includes a central area 210. The central area 210 is concave and arches inward towards internal components of the level gauge 200. As a result, the annular rim 208 is raised with respect to both the outer annular region 204 and the central area 210. The central area 210 is transparent or substantially transparent to wireless signals used by the level gauge 200 to determine the level of material in a tank. The remaining portions of the housing 202 could be substantially or completely reflective or absorptive of the wireless signals.

The gauge 200 in this example is said to represent a "volcano cone" structure. This is because the outer surface of the housing 202 extends from the outer annular region 204 to the raised annular rim 208 before falling back into a "crater" in the form of the concave central area 210.

The annular regions 204-208 are formed from one or more metals or other material(s) that can withstand the environment inside a tank 102, such as stainless steel. Also, the concave central area 210 is formed from a polymer or other material(s) that can withstand the environment inside a tank 102 without significantly interfering with operation of the gauge 200, such as a polytetrafluoroethylene (PTFE) layer. In particular embodiments, the PTFE layer could be about 82 mm wide and about 9 mm-9.5 mm thick with a radius of curvature of about 60 mm-61 mm. The PTFE material is substantially inert against a variety of different chemical erosions.

Because the central area 210 is concave, substantially all of the water or other liquids that condense on the central area 210 flows away from the central area 210 towards the rim 208. As a result, the gauge 200 is able to effectively cope with condensation effects. Also, the concave central area 210 can be sealed to other portions of the housing 202, forming an air-tight seal against the contents of the tank 102 that is able to withstand an elevated pressure within the tank 102. As a specific example, the PTFE layer described above could withstand a pressure of at least several bars, such as about three bars (three times normal atmospheric pressure). Note that the concave central area 210 can be connected to the other portions of the housing 202 in any suitable manner, such as with an annular structure 211 that uses bolts or other mechanism to secure the concave central area 210 and push the concave central area 210 into the other portions of the housing 202. In addition, the concave central area 210 can have little if any effect on the wireless signals used by the level gauge 200. For instance, the PTFE layer could at most have only a minor influence on the accuracy of a UWB MMW radar.

The level gauge 200 in this example also includes a control unit 212, a transceiver 214, an antenna 216, and an antenna lens 218. The level gauge 200 transmits wireless signals towards the material 104 in the tank 102 and receives wireless signals reflected off the material 104 in the tank 102. The signals are then analyzed to determine the material level. In this example, the transceiver 214 generates signals for wireless transmission via the antenna 216, and the transceiver 214 processes signals received wirelessly by the antenna 216. The antenna 216 transmits and receives the wireless signals. The antenna lens 218 focuses wireless signals being transmitted into a narrower beam width. The control unit 212 controls the transmission of the wireless signals and analyzes the signals to determine the material level.

The control unit 212 includes any suitable structure for controlling the transmission of wireless signals for identifying a material level in a tank and possibly analyzing signals to identify the material level in the tank. The transceiver 214 includes any suitable structure for transmitting and receiving wireless signals, such as a UWB MMW transceiver. Note that while shown as a single unit, the transceiver 214 could include a transmitter and a separate receiver. The antenna 216 includes any suitable structure for transmitting and receiving wireless signals, such as a radio frequency (RF) antenna. Note that while a single antenna 216 is shown, multiple antennas could be used, such as a transmit antenna and a receive antenna. The antenna lens 218 includes any suitable structure for focusing wireless signals.

Figure 3:
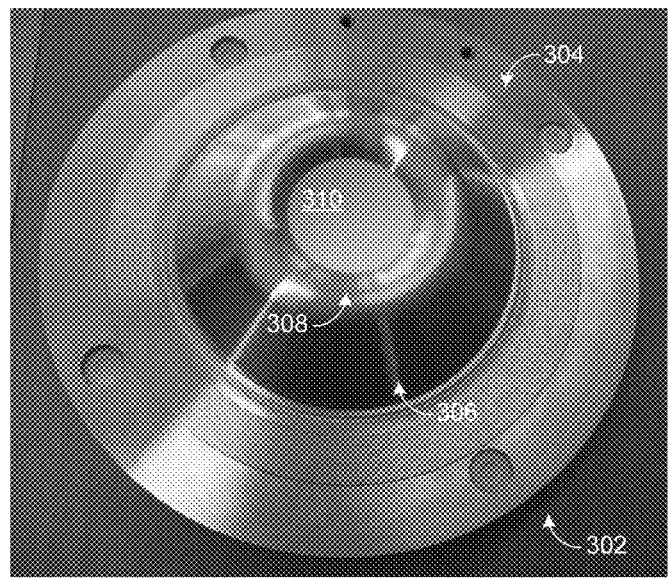

FIG. 3 illustrates an example lower housing 302 of a level gauge. As shown in FIG. 3, the lower housing 302 includes an outer annular region 304, an angled annular region 306, and a raised annular rim 308. The annular regions 304-308 can be formed from at least one metal or other material(s). The lower housing 302 also includes a concave central area 310, which can be formed from PTFE or other material(s). As can be seen here, the concave central area 310 is sealed to the raised annular rim 308, which can help prevent material inside a tank 102 from reaching sensitive internal components of a level gauge.

Figure 4:
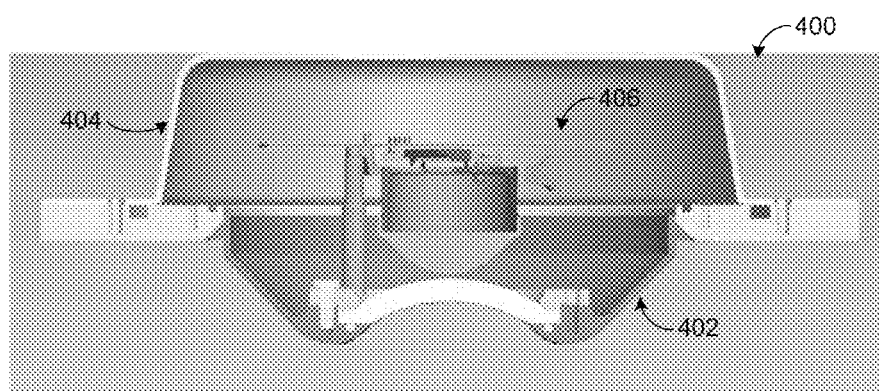

FIG. 4 illustrates an example level gauge 400 having both a lower housing 402 and an upper housing 404. The lower housing 402 is similar to the housings 202, 302 described above. The upper housing 404 covers internal components 406 of the level gauge 400, such as a control unit, transceiver, antenna, and antenna lens. The upper housing 404 therefore provides protection to the internal components 406 of the level gauge 400, such as protection from the ambient environment outside of a tank 102.

Although FIGS. 2A through 4 illustrate examples of level gauges with advanced antenna protection in a level gauging system, various changes may be made to FIGS. 2A through 4. For example, as shown in FIGS. 2A through 4, the lower housings 202, 302, 402 have the "volcano cone" shape since the sides of their angled annular regions are angled upward towards a crater formed by their concave central areas. Note, however, that the phrase "volcano cone" does not require that a housing's angled sides would form a perfect cone but for the presence of the housing's concave central area. While shown as circular rings, the various annular regions in each housing could have any suitable circular or non-circular shape as needed or desired. Similarly, while shown as circular discs, the various concave central regions in each housing could have any suitable circular or non-circular shape as needed or desired. Also, each of the components shown in FIGS. 2A through 4 could have any suitable size and dimensions.

Figure 5:
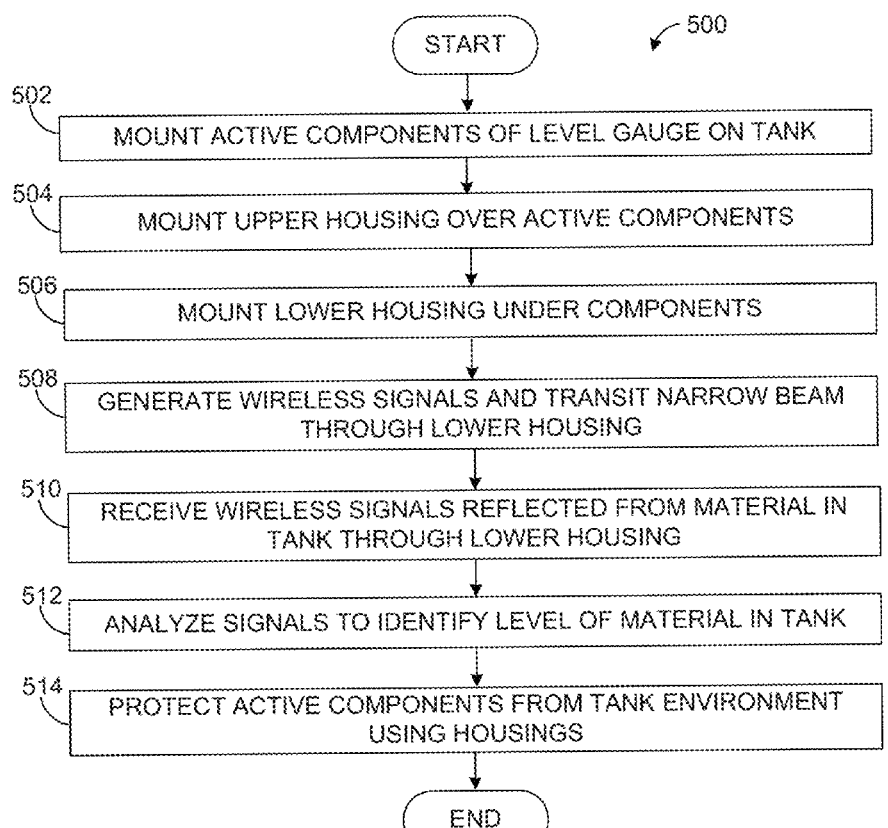
FIG. 5 illustrates an example method for level gauging according to this disclosure.

FIG. 5 illustrates an example method 500 for level gauging according to this disclosure. As shown in FIG. 5, active components of a level gauge are mounted on a tank at step 502, an upper housing is mounted over the active components at step 504, and a lower housing is mounted under the active components at step 506. The active components can include, for example, the control unit, transceiver, antenna, and antenna lens of the level gauge. In particular embodiments, at least the antenna is sized to fit within a small nozzle in the roof of the tank. Mounting the upper and lower housings could include securing the housings on opposite sides of the roof or trunk of the tank and possibly to each other. Note that these three steps may occur individually or collectively (in any order or combination).

Wireless signals are generated and a narrow beam is transmitted through the lower housing at step 508. This could include, for example, the transceiver 214 generating electrical signals that are converted by the antenna 216 into wireless signals. This could also include the antenna lens 218 focusing the wireless signals into a narrow beam. Note that any suitable wireless signals could be used, such as signals in the UWB MMW range. Wireless signals reflected from material in the tank are received through the lower housing at step 510. This could include, for example, the transceiver 214 receiving and processing electrical signals created by the antenna 216 upon receipt of the reflected signals. The signals are analyzed to determine a level of the material in the tank at step 512. Any suitable analysis operations could be used here, such as time of flight calculations.

During operation of the level gauge, the active components of the level gauge are protected by the housings from the tank environment at step 514. This could include, for example, one or both housings preventing material stored inside the tank from contacting the active components.

Note that because narrow beams are used, this can help to reduce or eliminate interference caused by reflections from the tank's walls, bottom, roof, and obstructions like agitators, ladders, and heat coils. Also, the level gauge can provide reliable operation regardless of whether the material level is close to the top or bottom of the tank. In addition, the lower housing can protect the level gauge's other components from corrosive or other materials, reduce or eliminate condensation problems, and withstand elevated pressures inside the tank.

Although FIG. 5 illustrates one example of a method 500 for level gauging, various changes may be made to FIG. 5. For example, while shown as a series of steps, various steps in FIG. 5 may overlap, occur in parallel, occur in a different order, or occur multiple times.

It may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A level gauge comprising:
   at least one antenna configured to transmit wireless signals towards a material in a tank and to receive wireless signals reflected from the material in the tank; and
   a housing comprising:
      an outer annular region having an inner perimeter;
      a raised annular rim within the inner perimeter of the outer annular region;
      an angled annular region that extends between the inner perimeter of the outer annular region and the raised annular rim and that is angled toward a longitudinal centerline of the housing away from the outer annular region; and
      a concave portion within the raised annular rim, the concave portion forming a crater within the housing;
   wherein the at least one antenna is configured to transmit and receive the wireless signals through the concave portion of the housing.

2. The level gauge of claim 1, wherein the raised annular rim is raised with respect to both the outer annular region and the concave portion.

3. The level gauge of claim 1, wherein:
   the outer annular region and the angled annular region comprise circular ring regions and a vertically inverted truncated cone; and
   the concave portion comprises a circular disc.

4. The level gauge of claim 1, wherein the housing is configured so that liquid that condenses on the concave portion substantially flows towards the raised annular rim and off the concave portion.

5. The level gauge of claim 1, wherein the concave portion of the housing is substantially transparent to the transmitted and received wireless signals.

6. The level gauge of claim 1, wherein:
   the outer annular region, the angled annular region, and raised annular rim comprise at least one metal; and
   the concave portion comprises polytetrafluorethylene.

7. The level gauge of claim 1, wherein the concave portion is sealed against the raised annular rim.

8. The level gauge of claim 1, further comprising:
   an antenna lens located between the at least one antenna and the concave portion of the housing, the antenna lens configured to focus the transmitted wireless signals.

9. The level gauge of claim 1, further comprising:
   a transceiver configured to generate electrical signals for wireless transmission by the at least one antenna and to process electrical signals received from the at least one antenna.

10. The level gauge of claim 1, further comprising:
    a control unit configured to identify a level of the material in the tank.

11. An apparatus comprising:
    a housing configured to protect one or more wireless components, the housing comprising:
       an outer annular region having an inner perimeter;
       a raised annular rim within the inner perimeter of the outer annular region;
       an angled annular region that extends between the inner perimeter of the outer annular region and the raised annular rim and that is angled toward a longitudinal centerline of the housing away from the outer annular region; and
       a concave portion within the raised annular rim, the concave portion forming a crater within the housing;
    wherein the concave portion is substantially transparent to wireless signals used by the one or more wireless components.

12. The apparatus of claim 11, wherein: the raised annular rim is raised with respect to both the outer annular region and the concave portion.

13. The apparatus of claim 12, wherein:
    the outer annular region and the angled annular region comprise circular ring regions and a vertically inverted truncated cone; and
    the concave portion comprises a circular disc.

14. The apparatus of claim 11, wherein the housing is configured so that liquid that condenses on the concave portion substantially flows towards the raised annular rim and off the concave portion.

15. The apparatus of claim 11, wherein:
    the outer annular region, the angled annular region, and raised annular rim comprise at least one metal; and
    the concave portion comprises polytetrafluorethylene.

16. The apparatus of claim 11, wherein the concave portion is sealed against the raised annular rim.

17. A method comprising:
    transmitting wireless signals towards a material in a tank through a housing; and
    receiving wireless signals reflected from the material in the tank through the housing;
    wherein the housing comprises:
       an outer annular region having an inner perimeter;
       a raised annular rim within the inner perimeter of the outer annular region;
       an angled annular region that extends between the inner perimeter of the outer annular region and the raised annular rim and that is angled toward a longitudinal centerline of the housing away from the outer annular region; and
       a concave portion within the raised annular rim, the concave portion forming a crater within the housing, the concave portion substantially transparent to the wireless signals.

18. The method of claim 17, wherein the raised annular rim is raised with respect to both the outer annular region and the concave portion.

19. The method of claim 17, wherein liquid that condenses on the concave portion substantially flows towards the raised annular rim and off the concave portion.

20. The method of claim 17, further comprising: determining a level of material in the tank using the wireless signals.

* * * * *